(12) United States Patent
Fery et al.

(10) Patent No.: US 8,389,097 B2
(45) Date of Patent: Mar. 5, 2013

(54) OPTICAL STORAGE MEDIUM COMPRISING A SUPER-RESOLUTION STRUCTURE WITH GRAINY IMPURITIES OF A DIELECTRIC MATERIAL

(75) Inventors: Christophe Fery, Niedereschach (DE);
Gael Pilard, Moenchweiler (DE)

(73) Assignee: Thomson Licensing, Issy-les-Moulineaux (FR)

( * ) Notice: Subject to any disclaimer, the term of this patent is extended or adjusted under 35 U.S.C. 154(b) by 225 days.

(21) Appl. No.: 12/807,486

(22) Filed: Sep. 7, 2010

(65) Prior Publication Data

US 2011/0064902 A1    Mar. 17, 2011

(30) Foreign Application Priority Data

Sep. 8, 2009   (EP) .................................... 09305821

(51) Int. Cl.
*B32B 3/02*   (2006.01)
(52) U.S. Cl. .................. 428/64.1; 428/64.4; 430/270.11
(58) Field of Classification Search ................ 428/64.4; 430/270.11
See application file for complete search history.

(56) References Cited

U.S. PATENT DOCUMENTS 7,442,424 B2 *  10/2008  Hwang et al. ................ 428/64.4
2008/0273447 A1  11/2008  Hyot et al.

FOREIGN PATENT DOCUMENTS

| EP | 1978517 | 10/2008 |
|---|---|---|
| EP | 2109104 | 10/2009 |
| WO | WO2009121912 | 10/2009 |

OTHER PUBLICATIONS

Hyot et al., "Simulation of the Writing and Erasing Processes of GeSbTe and GeSbTeSn with GeN Interlayers in the Case of Dual Level DVR Discs", International Symposium on Optical Memory and Optical Data Storage (IEEE), Jul. 7, 2002, pp. 132-134.
Hyot et al., "Analysis of Writing and Erasing Behaviours in Phase Change Materials", Journal of Magnetism and Magnetic Materials, vol. 249, No. 3, Sep. 1, 2002, pp. 504-508.
Hyot et al., "Super-Resolution ROM Disc with a Semi-Conductive InSb Active Layer", EPCOS—European Phase Change and Ovonics Symposium, Jan. 1, 2007, pp. 1-4.
Search Report dated Nov. 26, 2009.

* cited by examiner

*Primary Examiner* — Elizabeth Mulvaney
(74) *Attorney, Agent, or Firm* — Myers Wolin, LLC

(57) ABSTRACT

The optical storage medium comprises a substrate layer, a read-only data layer with a pit structure disposed on the substrate layer, a cover layer and a nonlinear layer with a super-resolution structure disposed between the data layer and the data layer, which super-resolution structure includes a semiconductor material and grainy impurities of a dielectric material, wherein the semiconductor material has an increased reflectivity, when irradiated with a laser beam, and wherein the dielectric material is arranged as a dielectric layer having a thickness below 5 nm. The dielectric material consists advantageously of an inhomogeneous layer of a nitride material, for example GeN, arranged between a first and a second nonlinear layer.

9 Claims, 3 Drawing Sheets

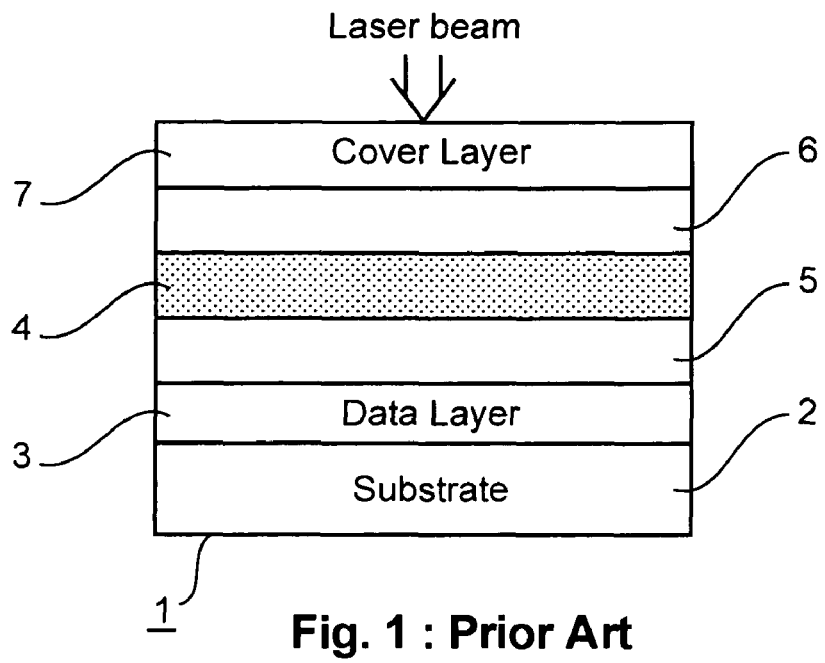
Fig. 1 : Prior Art
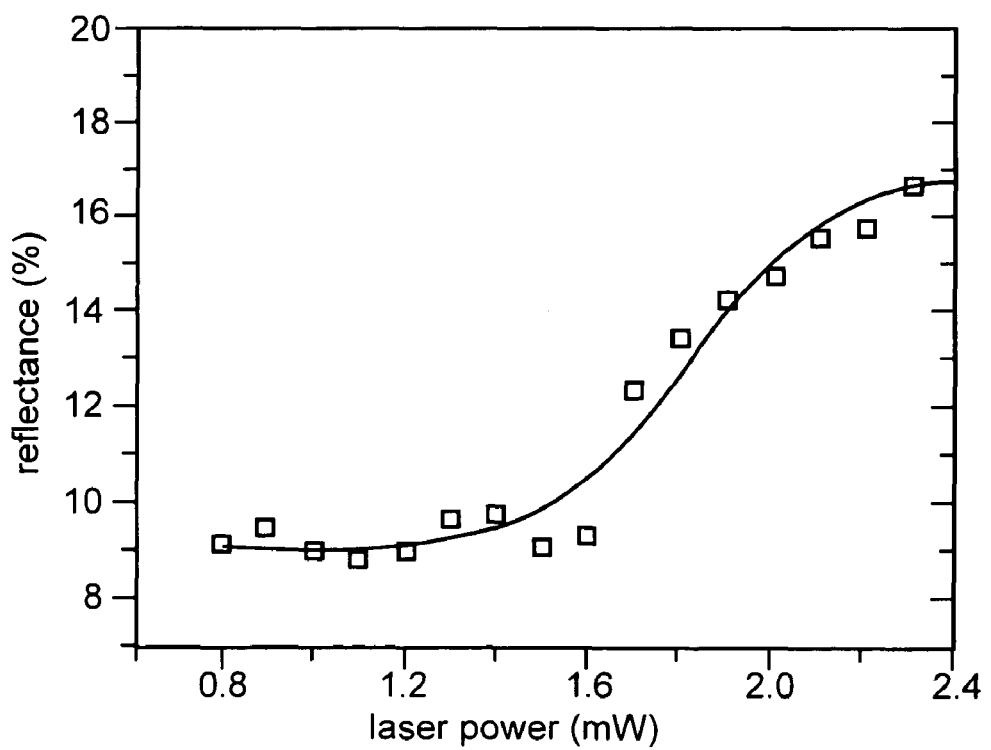
Fig. 2

OPTICAL STORAGE MEDIUM COMPRISING A SUPER-RESOLUTION STRUCTURE WITH GRAINY IMPURITIES OF A DIELECTRIC MATERIAL

This application claims the benefit, under 35 U.S.C. §119 of European Patent Application 09305821.2, filed Sep. 8, 2009.

TECHNICAL FIELD OF THE INVENTION

The present invention relates to an optical storage medium comprising a substrate layer, a data layer and a nonlinear layer with a super-resolution structure disposed on the data layer. The optical storage medium is in particular a read-only optical disc having a high data density for applications with appliances utilizing a blue laser diode.

BACKGROUND OF THE INVENTION

Optical storage media are media in which data are stored in an optically readable manner, for example by means of a laser and a photo-detector being integrated within a pickup. The photo-detector is used for detecting the reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to 50 GB on a dual layer disc. For reading and writing of a Blu-Ray disc an optical pickup with a laser wavelength of 405 nm is used. On the Blu-Ray disc a track pitch of 320 nm and a mark length from 2T to 8T and 9T is used, where T is the channel bit length, and which corresponds with a minimum mark length of 138-160 nm. The re-writable BD-RE disc is based on a phase change technology comprising a phase change layer, which uses for example a compound of AgInSbTe or GeSbTe. Further information about the Blu-Ray disc system is available for example from the Blu-Ray group via internet: www.blu-raydisc.com.

New optical storage media with a super-resolution structure offer the possibility to increase the data density of the optical storage medium by a factor of two to four in one dimension as compared with the Blu-Ray disc. This is possible by including a nonlinear layer, which is placed above the data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, and which center reflectivity is dependent on the pit structure of the corresponding data layer. Therefore, the super-resolution effect allows to record and read data stored in marks of an optical disc, which have a size below the diffraction limit of a corresponding optical pickup.

In the articles Hyot et al, "Phase change materials and Super-RENS", E*PCOS 05, Technical Digest, Cambridge, 2005, and Pichon et al, "Multiphysics Simulation of Super-Resolution BD ROM Optical Disk Readout" 2006 IEEE, 0-7803-9494-1/06, PP 206-208, a semi-conducting nonlinear layer is proposed in which a local change of the refractive index can be obtained through photo generation of free carriers. A thermal description is given to provide information on temperature distribution of a data layer during readout.

It has been shown that the optimum thickness of the InSb nonlinear layer itself is about 20 nm due to the microcrystalline structure, as described in Hyot et al., "Super-Resolution ROM disk with a semi-conductive InSb active layer: influence of the crystalline microstructure", ISOM Tech. Dig., 2007, p. 12. Including some tolerance, the optimum thickness can be expected to be in a range of 15 to 25 nm. For thicker InSb layers, it is assumed that the crystalline microstructure is increasing when heating with a laser and therefore the super-resolution effect is reduced. As a consequence, a thicker InSb layer cannot be used to improve the reflectivity change.

SUMMARY OF THE INVENTION

The optical storage medium comprises a substrate layer, a read-only data layer with a pit structure disposed on the substrate layer, a cover layer and a nonlinear layer with a super-resolution structure arranged between the data layer and the cover layer, the super-resolution structure comprising grainy impurities of a dielectric material. The nonlinear layer comprises a semiconductor material as the super-resolution-structure, which has an increased reflectivity when irradiated with a laser beam, and the dielectric material is arranged as a dielectric layer having a thickness below 5 nm.

The dielectric material may be deposited above the data layer together with the semiconductor material, e.g. by using a sputtering target with a semiconductor material and a sputtering target with a dielectric material and sputtering both materials at the same time on the data layer. As an alternative, a first nonlinear layer is disposed above the data layer in a first step, in the next step, the dielectric material is disposed as an inhomogeneous, grainy layer on the first nonlinear layer and in a further step, a second nonlinear layer is disposed on the dielectric layer, wherein the thickness of the dielectric layer is so small, that the dielectric layer corresponds with grainy impurities between the first and second nonlinear layer. The dielectric layer has in particular a thickness below 5 nm, which thickness can be provided by sputtering the dielectric material only for a very short dispose time on the first nonlinear layer.

The grainy impurities of the dielectric material included in the nonlinear layer provide an increased stability of the optical storage medium when reading data, which may be explained in that the grainy impurities limit the crystallization of the amorphous semiconductor material when illuminated with a laser beam. The crystallization is dependent in addition on the thickness of the one or two nonlinear layers. In a preferred embodiment having two nonlinear layers, the first and second nonlinear layers have each a thickness within a range of 10-40 nm.

The optical storage medium is in particular an optical disc having outside dimensions similar to a Blu-Ray disc and the data layer is arranged as a read-only data layer with a pit structure. Between the data layer and the one or two nonlinear layers, advantageously a first, respectively a second dielectric layer is disposed and a second, respectively a third dielectric layer is arranged between a cover layer and the one or two nonlinear layers. The dielectric material comprises or consists advantageously of a nitride material, for example GeN.

BRIEF DESCRIPTION OF THE DRAWINGS

Preferred embodiments of the invention are explained in more detail below by way of example with reference to schematic drawings, which show:

FIG. 1 an optical disc with a nonlinear layer comprising a super-resolution structure according to prior art, FIG. 2 measured reflectivity values in dependency of the incident laser power of an optical disc in accordance with FIG. 1, comprising an InSb layer as the nonlinear layer, FIG. 3 jitter values as a function of the laser power for the optical disc of FIG. 1, FIG. 4 reflectivity values as a function of time when is reading data from the optical disc of FIG. 1, FIG. 5 an optical disc with a two nonlinear layers according to a preferred embodiment of the invention, and FIG. 6 several reflectivity measurements as a function of time.

DETAILED DESCRIPTION OF PREFERRED EMBODIMENTS

Figure 3:
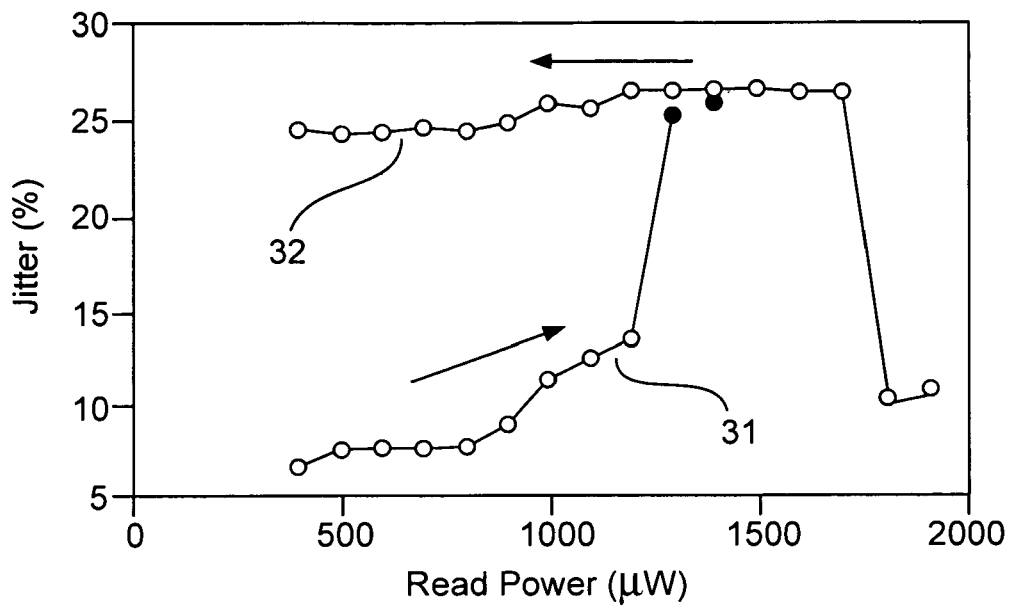

An optical storage medium 1 comprising a nonlinear layer 4 with a super-resolution structure according to prior art is shown in a cross section in FIG. 1 in a simplified manner. The super-resolution structure is for example a super-resolution near-field structure (Super-RENS). The storage medium 1 comprises further a substrate 2, on which a data layer 3 is arranged having a read-only, pressed pit structure, or alternatively, a groove structure for providing recordings. On the data layer 3 a first dielectric layer 5 is arranged as a protection layer. In addition, a reflective metallic layer, not shown in FIG. 1, for example an aluminum layer, may be arranged between the dielectric layer 5 and the data layer 3. The nonlinear layer 4 is also called a mask layer because it is arranged above the data layer 3 and for some specific materials only the high intensity center part of a laser beam essentially penetrates the nonlinear layer 4. The optical storage medium 1 is for example an optical disc having outside dimensions similar to a Blu-Ray disc.

The optical storage medium 1 comprises further a cover layer 7 as a protection of the storage medium 1 and a second dielectric layer 6 arranged between the cover layer 7 and the nonlinear layer 4. For reading the data of the data layer 3, a laser beam, indicated by an arrow, is applied to the top of the storage medium 1, penetrating first the cover layer 7. The first and second dielectric layers 5, 6 comprise for example the material $ZnS$—$SiO_2$. The substrate 2 and the cover layer 7 may consist of a plastic material, as known from DVDs and CDs. In other embodiments, the reflective metallic layer may be omitted, when a super-resolution near-field structure is used, which does not provide an increase in transmittance due to a heating effect, but works with any other super-resolution effect.

A preferred material for the super-resolution structure of the nonlinear layer 4 is for example InSb alloy. An optical storage medium comprising InSb as a super-resolution layer shows an increase in reflectivity, when an irradiating laser power is increased above 1.6 mW, as shown in FIG. 2. This can be explained by transitions of electrons from the valence band to the conduction band of InSb. A semiconductor with a high electron density in the conduction band has a high reflectivity for light, comparable to a metal. The electron density in the conduction band can be further increased by using an n-doping material, for example selenium or tellurium, for doping of the semiconductor.

An optical disc using InSb as the nonlinear layer 4 exhibits sufficiently high carrier-to-noise ratios for application as a read-only optical storage medium at a moderate laser power. But recent investigations have shown that for optical discs comprising InSb as a super-resolution layer, the data structure of the optical disc can be damaged irreversibly, when reading data with a laser power being already within a range of 1 mW to 1.9 mW, at a rotation speed of the optical disc of about 5.0 m/s.

In FIG. 3 jitter measurements as a function of the reading power are shown for an optical disc comprising InSb as a super-resolution layer sandwiched between two dielectric layers, as shown in FIG. 1. A first graph 31 relates to measurements, in which the reading power is continuously increased from 0.5 mW up to about 2 mW for a selected region of the optical disc. As shown by graph 31, the jitter values remain below values of about 10% up to a laser power of 1 mW, but then the jitter values increase and reach non-tolerable 25% in the power region of 1.5 mW.

The second graph 32 shows jitter measurements performed on another selected region of the optical disc by starting with a high power of about 2 mW and decreasing continuously the read power to values of about 0.5 mW. As can be seen, the jitter values increase sharply after a short period to values of about 25%, which value is essentially retained also for smaller laser powers down to about 0.5 mW. This clearly shows that the data structure is irreversibly damaged by the higher laser power. An optical disc with InSb as the super-resolution layer therefore may not provide a sufficient long-term stability as necessary for a commercially usable optical storage medium.

Figure 4:
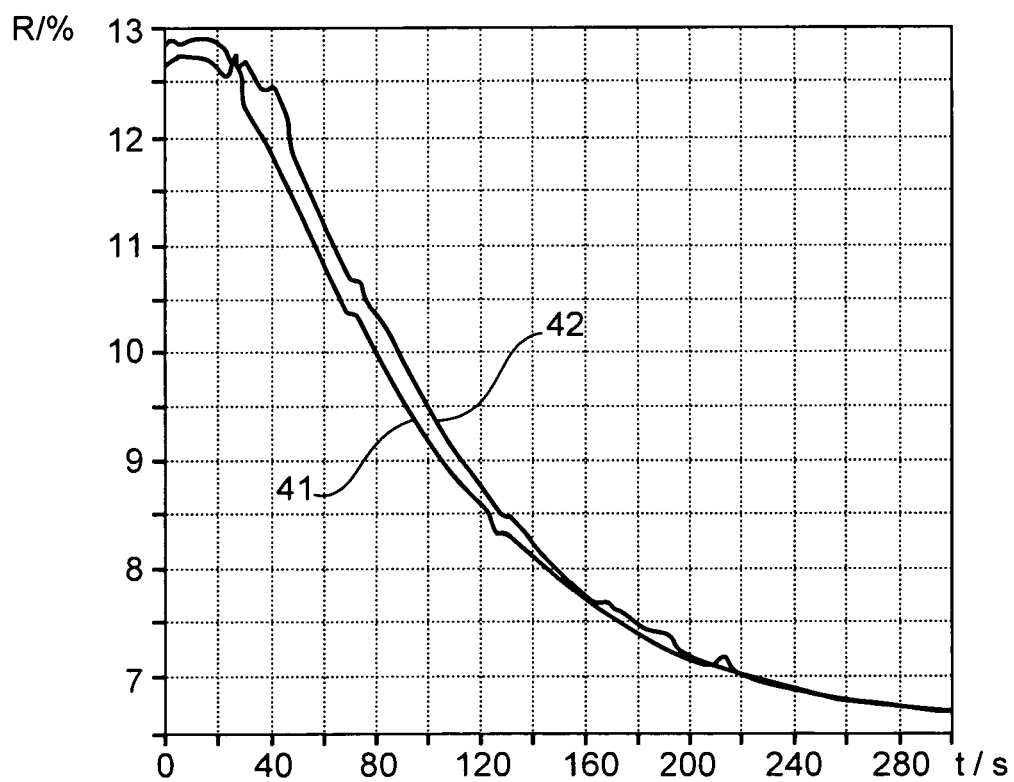

The degradation of the optical disc can be deduced also from reflectivity measurements, as shown in FIG. 4. The graph 41 shows a reflectivity measurement of a single track, which is read continuously with a laser power of 2 mW. This laser power is sufficient for providing a super-resolution effect for an optical disc comprising InSb as the nonlinear layer. As can be seen, for a time t of about 30 sec, the reflectivity R remains high, but then decreases continuously to a reflectivity value, which is after 300 sec only about 50% of the starting value. Graph 42 shows a second reflectivity measurement of another track, which shows a similar result.

To overcome this problem, an optical storage medium according to the invention comprises a substrate layer, a data layer disposed on the substrate layer, a cover layer and a nonlinear layer with a super-resolution structure disposed between the data layer and the cover layer. The super-resolution structure comprises a semiconductor material and grainy impurities of a dielectric material, and the semiconductor material has an increased reflectivity, when irradiated with a laser beam. The nonlinear layer comprises a material having an increased reflectivity when irradiated with a laser beam, for example a semiconductor material.

In a first preferred embodiment, an optical storage medium 51 comprises a substrate layer 52, on which a data layer 52a is arranged. The data layer 52a comprises in particular a pit structure as a read-only data layer. Above the data layer 52a a first nonlinear layer 54 with a first super-resolution structure and a second nonlinear layer 56 with a second super-resolution structure are arranged for providing the function of mask layers for the data layer 52a. The first and second nonlinear layers 54, 56 comprise a material having an increased reflectivity when irradiated with a laser beam, for example a semiconductor material. A first dielectric layer 55 is arranged between the first nonlinear layer 54 and the second nonlinear layer 56. The first dielectric layer 55 is an ultra-thin layer and comprises a dielectric material being arranged as an inhomogeneous grainy dielectric layer between the first and the second nonlinear layers 54, 56. The dielectric layer has in particular a thickness below 5 nm, which thickness can be provided by sputtering the dielectric material only for a very short dispose time on the first nonlinear layer 54.

The thickness of the dielectric layer 55 is in particular selected such, that no continuous layer 55 is obtained, but a layer, in which the GeN material is deposited as an inhomogeneous, grainy dielectric layer 55 between the first and the second nonlinear layers 54, 56, which can be understood as a layer providing grainy or granular dielectric impurities between the first and the second nonlinear layers 54, 56. Such an ultra-thin dielectric layer can be manufactured by using a sputtering process with a very short exposure time.

The data layer 52a is separated advantageously by a second dielectric layer 53 from the first nonlinear layer 54 and a third dielectric layer 57 is arranged above the second nonlinear layer 56. Above the third dielectric layer 57 a cover layer 58 is placed as a protection for the optical storage medium 51. A laser beam for reading or writing of data is applied from the top, penetrating first the cover layer 58 and being focused onto the data layer 52a.

The nonlinear layers 54, 56 comprise in particular a semiconductor material of the III-V semiconductor family, for example GaSb or an indium alloy with a bandgap below 1 eV, for example InAs or InSb. The semiconductor material may be doped in addition by using an n-doping material, for example selenium and/or tellurium, for increasing the reflectivity of the nonlinear layers 54, 56 when irradiated with a laser beam. Both nonlinear layers 54, 56 comprise or consist in particular of the same semiconductor material.

In a preferred design, the first and second nonlinear layers 54, 56 have a thickness within a range of 10-40 nm, for which best modulation signals are expected. The second dielectric layer 53 has for example a thickness within a range of 40-100 nm and the third dielectric layer 57 has a thickness within a range of 20-80 nm. The optical storage medium is in particular an optical disc having a read-only data layer with a pit structure.

In another preferred embodiment, a nonlinear layer with a super-resolution structure is disposed above the data layer 52a, which super-resolution structure comprises a semiconductor material and grainy impurities of a dielectric material 55, and wherein the semiconductor material has an increased reflectivity, when irradiated with a laser beam. In addition, a first dielectric layer disposed between the data layer and the nonlinear layer, a cover layer and a second dielectric layer between the cover layer and the nonlinear layer are provided advantageously. The dielectric material is deposited for example together with the semiconductor material above the data layer, e.g. by using a sputtering target with a semiconductor material and a sputtering target with a dielectric material and sputtering both materials at the same time on the data layer.

Figure 6:
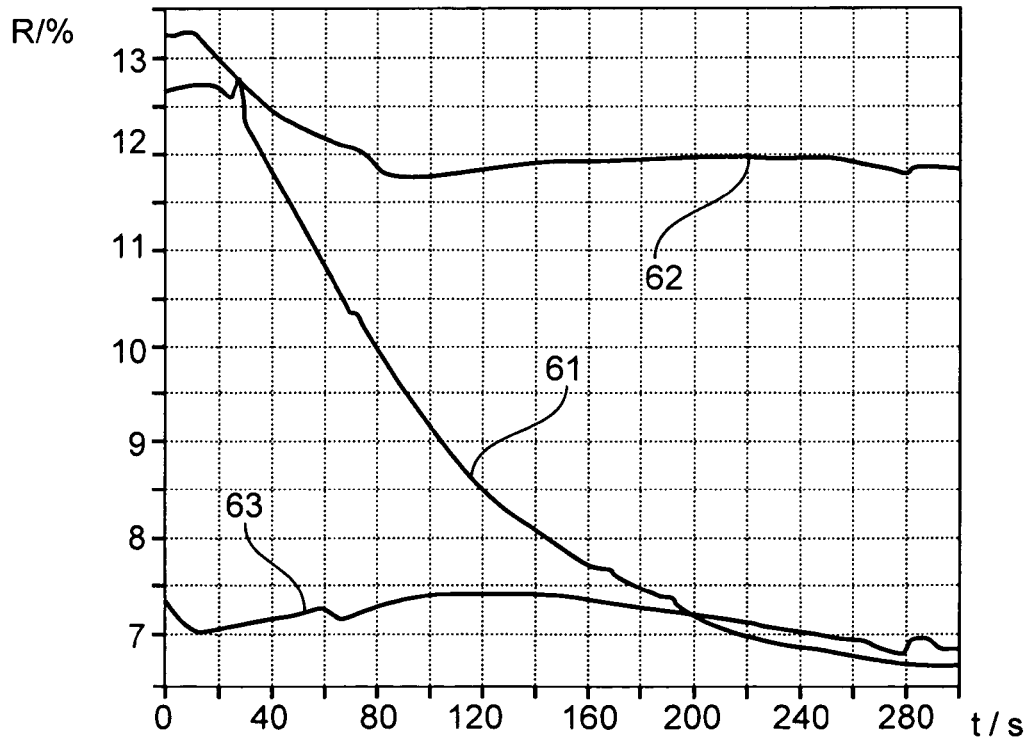

With an optical storage medium of this kind, a high reflectivity value R can be obtained for longer read-out periods, as shown in FIG. 6. The graph 61 shows a measurement of the reflectivity R of a single track which is continuously read out with a laser power of 2 mW, in correspondence with graph 41 of FIG. 4.

Figure 5:
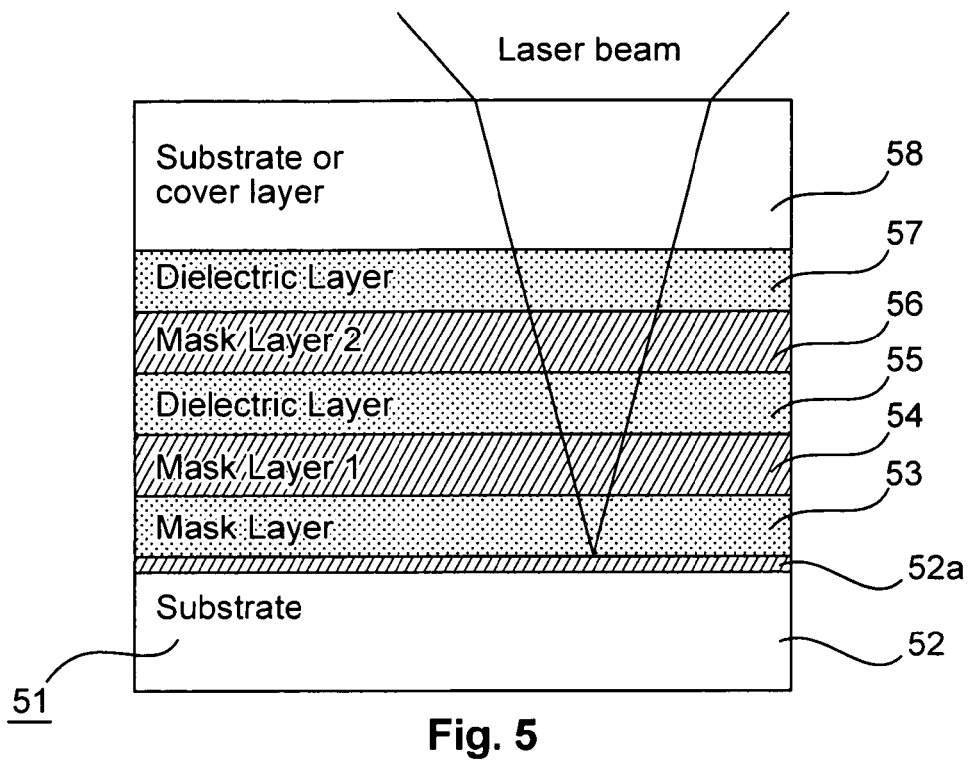

The graph 62 is based on a measurement with an optical disc comprising two InSb nonlinear layers, being separated by a very thin GeN layer, in correspondence with the optical storage medium 51 of FIG. 5. For the embodiment used for the measurement of graph 62, the first and second nonlinear layers 54, 56 have each a thickness of 10 nm and the dielectric layer 55 has a thickness of 3 nm. The second dielectric layer 53 has a thickness of 70 nm and the third dielectric layer 57 has a thickness of 50 nm.

In addition, results of a measurement are shown, graph 63, which are based on an optical disc comprising two InSb nonlinear layers in correspondence with the optical storage medium 51 used for the measurement of graph 62, but with a GeN dielectric layer having a homogeneous thickness of 6 nm. The measurement shows that with just a little thicker GeN layer, only low reflectivity values are obtained.

It is assumed that the ultra-thin GeN layer placed between the two InSb layers provides dielectric isles which act as seeds for the re-crystallization, as induced by the read-out with a high laser power. The ultra-thin GeN layer can be seen therefore impurities, which limit the growth of the InSb crystals to a certain grain size. The limited grain size is dependent in addition on the thickness of the InSb layers, having each a very thin thickness of 10 nm in a preferred embodiment for providing a total thickness of about 20-25 nm for an active layer stack consisting of the two nonlinear layers 54, 56 and the dielectric layer 55.

The ultra-thin GeN layer inserted between the two InSb nonlinear layers improves therefore remarkably the read-out stability of the optical disc. But also other dielectric materials, for example other nitride materials, are usable for the dielectric layer 55. Essential limitations for the material selection are only that the dielectric material should not be chemically reactive with the InSb layer and that the diffusivity is small for the temperature region obtained when reading a selected track of the optical disc. Correspondingly, also other semiconductor materials having an increased reflectivity, when irradiated with a laser beam, can be used for the nonlinear layers 54, 56. The optical storage medium of the invention is particularly not limited for use with a Blu-Ray type pick-up utilizing a laser wavelength of 405 nm. Also other embodiments of the invention can be made by a person skilled in the art without departing from the scope of the present invention. The invention resides therefore in the claims herein after appended.

The invention claimed is:

1. Optical storage medium comprising:
   a substrate layer,
   a read-only data layer with a pit structure disposed on the substrate layer,
   a cover layer, and
   a nonlinear layer with a super-resolution structure disposed between the data layer and the cover layer, which super-resolution structure comprises a semiconductor material and grainy impurities of a dielectric material, wherein
   the semiconductor material has an increased reflectivity, when irradiated with a laser beam,
   the nonlinear layer comprises:
   a first nonlinear layer with a super-resolution structure disposed above the data layer,
   a second nonlinear layer with a super-resolution structure disposed above the first nonlinear layer,
   and the dielectric material is arranged as a dielectric layer of inhomogeneous thickness with a thickness below 5 nm between the first and the second nonlinear layers.

2. The optical storage medium of claim 1, comprising a second dielectric layer disposed between the substrate layer and the first nonlinear layer, and a third dielectric layer between the cover layer and the second nonlinear layer.

3. The optical storage medium of claim 2, wherein the first and the second nonlinear layers have each a thickness within a range of 10-40 nm, the second dielectric layer has a thickness within a range of 40-100 nm and the third dielectric layer has a thickness within a range of 20-80 nm.

4. The optical storage medium of claim 1, wherein both nonlinear layers comprise or consist of the same semiconductor material.

5. The optical storage medium of claim 1, comprising a second dielectric layer disposed between the data layer and the nonlinear layer, and a third dielectric layer between the cover layer and the nonlinear layer.

6. The optical storage medium of claim 1, wherein the semiconductor material is one of the III-V semiconductor family, or an indium alloy having a bandgap below 1 eV.

7. The optical storage medium of claim 1, wherein the dielectric material comprises a nitride material.

8. The optical storage medium of claim 1, wherein the dielectric material comprises the material GeN.

9. The optical storage medium of claim 1, wherein the optical storage medium is an optical disc.

* * * * *